United States Patent
Pintauro et al.

(10) Patent No.: US 9,905,870 B2
(45) Date of Patent: Feb. 27, 2018

(54) NANOFIBER ELECTRODE AND METHOD OF FORMING SAME

(75) Inventors: Peter N. Pintauro, Brentwood, TN (US); Wenjing Zhang, Copenhagen (DK)

(73) Assignee: VANDERBILT UNIVERSITY, Nashville, TN (US)

( * ) Notice: Subject to any disclaimer, the term of this patent is extended or adjusted under 35 U.S.C. 154(b) by 91 days.

(21) Appl. No.: 13/823,968

(22) PCT Filed: Oct. 27, 2011

(86) PCT No.: PCT/US2011/058088
§ 371 (c)(1),
(2), (4) Date: Mar. 15, 2013

(87) PCT Pub. No.: WO2012/058425
PCT Pub. Date: May 3, 2012

(65) Prior Publication Data
US 2013/0209913 A1    Aug. 15, 2013

Related U.S. Application Data

(60) Provisional application No. 61/407,332, filed on Oct. 27, 2010.

(51) Int. Cl.
*H01M 8/00* (2016.01)
*H01M 4/04* (2006.01)
(Continued)

(52) U.S. Cl.
CPC ....... *H01M 8/1004* (2013.01); *B29C 47/0014* (2013.01); *D01D 5/003* (2013.01);
(Continued)

(58) Field of Classification Search
CPC .. H01M 8/1004; H01M 8/102; H01M 8/1039; H01M 4/8853; H01M 4/8864; D01D 5/007; D01D 5/003; B29C 47/0014
See application file for complete search history.

(56) References Cited

U.S. PATENT DOCUMENTS

2007/0207360 A1   9/2007   Tamura et al.
2008/0248362 A1   10/2008  Sayre et al.
(Continued)

FOREIGN PATENT DOCUMENTS

CN   1873064 A      12/2006
CN   101665232 A    3/2010
(Continued)

OTHER PUBLICATIONS

Hong Chen, Joshua D. Snyder, and Yossef A. Elabd, "Electrospinning and Solution Properties of Nafion and Poly(acrylic acid)", Dec. 13, 2007, Macromolecules 2008, 41, 128-135.*
(Continued)

*Primary Examiner* — Jonathan Jelsma
(74) *Attorney, Agent, or Firm* — Locke Lord LLP; Tim Tingkang Xia, Esq.

(57) ABSTRACT

In one aspect, a method of forming an electrode for an electrochemical device is disclosed. In one embodiment, the method includes the steps of mixing at least a first amount of a catalyst and a second amount of an ionomer or uncharged polymer to form a solution and delivering the solution into a metallic needle having a needle tip. The method further includes the steps of applying a voltage between the needle tip and a collector substrate positioned at a distance from the needle tip, and extruding the solution from the needle tip at a flow rate such as to generate electrospun fibers and deposit the generated fibers on the collector substrate to form a mat with a porous network of fibers. Each fiber in the porous network of the mat has
(Continued)

distributed particles of the catalyst. The method also includes the step of pressing the mat onto a membrane.

14 Claims, 8 Drawing Sheets

(51) Int. Cl.
    *H01M 4/88*     (2006.01)
    *H01M 8/1004*     (2016.01)
    *D01D 5/00*     (2006.01)
    *H01M 8/102*     (2016.01)
    *H01M 8/1039*     (2016.01)
    *H01M 4/90*     (2006.01)
    *H01M 4/92*     (2006.01)
    *B29C 47/00*     (2006.01)
    *H01M 8/1018*     (2016.01)

(52) U.S. Cl.
CPC ........ *D01D 5/0007* (2013.01); *H01M 4/8853* (2013.01); *H01M 4/8864* (2013.01); *H01M 4/8896* (2013.01); *H01M 4/9041* (2013.01); *H01M 4/926* (2013.01); *H01M 8/102* (2013.01); *H01M 8/1039* (2013.01); *H01M 2008/1095* (2013.01)

(56) References Cited

U.S. PATENT DOCUMENTS

2008/0305377 A1* 12/2008 Shui et al. .................... 429/30
2009/0155658 A1* 6/2009 Kotera ................. D01D 5/0069
                                                 429/492
2010/0015493 A1 1/2010 Adachi et al.

FOREIGN PATENT DOCUMENTS

| | | |
|---|---|---|
| EP | 1858096 A1 | 11/2007 |
| JP | 2007319839 A | 12/2007 |
| JP | 2008243777 A | 10/2008 |
| JP | 2010095826 A * | 4/2010 |
| WO | 2006/055652 A2 | 5/2006 |
| WO | 2009/075357 A1 | 6/2009 |
| WO | 2010063888 A1 | 6/2010 |

OTHER PUBLICATIONS

K. M. Lee, J. Choi, R. Wycisk, P. N. Pintauro, and P. T. Mather, "Nafion Nanofiber Membranes", 2009, ECS Transactions, 25 (1) 1451-1458.*
Machine translation of JP 2010-095826 A.*
Machine translation of MT 2008-243777 A.*
Lee W. Young, PCT/US2011/058088 International Search Report, dated Apr. 10, 2012, International Search Authority/US.
State Intellectual Property Office of P.R. China, Office Action for Chinese Application No. 201180062942.7, dated Jun. 9, 2014.
State Intellectual Property Office of P.R. China, "Final Examination Statement for CN Application No. 201180062942.7", China, Mar. 24, 2015.
Kotera et al., Study on the cathode fabricated by spinning process and its performances in PEFC, ECS Transactions, 25(1) 821-830, 2009.
Japan Patent Office, "Notification of Reasons for Rejection for JP Application No. 2013-536826", Japan, Aug. 18, 2015.
Chen, Hong et al., "Electrospinning and Solution Properties of Nafion and Poly(acrylic acid)", Macromolecules, vol. 41, No. 1, 2008, pp. 2-9.
European Patent Office, "Supplementary European Search Report for EP Application No. 11837086", Munich, Feb. 3, 2017.

* cited by examiner

500

510  512             520  522

(a)                  (b)

530                  540

(c)                  (d)

NANOFIBER ELECTRODE AND METHOD OF FORMING SAME

CROSS-REFERENCE TO RELATED PATENT APPLICATION

This PCT application claims the benefit, pursuant to 35 U.S.C. § 119(e), of U.S. provisional patent application Ser. No. 61/407,332, filed Oct. 27, 2010, entitled "NANOFIBER FUEL CELL ELECTRODE AND METHOD OF FORMING SAME," by Peter N. Pintauro and Wenjing Zhang, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

STATEMENT OF FEDERALLY-SPONSORED RESEARCH

The invention was made with government support under Grant No. DE-FG36-06GO16030 awarded by U.S. Department of Energy (DOE). The government has certain rights in the invention.

FIELD OF THE INVENTION

The present invention relates generally electrochemical devices such as fuel cells. More specifically, the present invention relates to nanofiber electrode morphology formed by electrospinning.

BACKGROUND OF THE INVENTION

There has been considerable research over the past twenty years on new catalysts for proton exchange membrane (PEM) fuel cells. The motivation has been to increase catalytic activity, particularly for the cathode in a hydrogen/air fuel cell. Most fuel cell electrodes are fabricated by a decal method or by catalyst-ink on a carbon paper gas diffusion layer (GDL). The platinum (Pt) catalyst utilization efficiency in such structures is not as high as desired. There has been little research conducted to improve electrode structures and methods of fabricating fuel cell membrane-electrode-assemblies with improved catalyst utilization.

Therefore, a heretofore unaddressed need exists in the art to address the aforementioned deficiencies and inadequacies.

SUMMARY OF THE INVENTION

In one aspect, the present invention relates to a method of forming an electrode for an electrochemical device. In one embodiment, the method includes the steps of mixing at least a first amount of a catalyst and a second amount of an ionomer to form a solution, and delivering the solution into a metallic needle having a needle tip. The method further includes the steps of applying a voltage between the needle tip and a collector substrate positioned at a distance from the needle tip, and extruding the solution from the needle tip at a flow rate such as to generate electrospun nanofibers and deposit the generated nanofibers on the collector substrate to form a mat with a porous network of nanofibers, wherein each nanofiber has distributed particles of the catalyst. The method also includes the step of pressing the mat onto a polymer membrane.

In one embodiment, the catalyst includes platinum-supported carbon (Pt/C), the ionomer includes the perfluorosulfonic acid polymer known as Nafion®, and the step of forming the solution further includes mixing a third amount of a second polymer with the first amount of catalyst and second amount of ionomer. The second polymer includes polyacrylic acid (PAA), and the ratios between the catalyst, ionomer, and second polymer are about 15:3:2 by weight. The collector substrate includes a carbon paper or carbon cloth gas diffusion layer disposed on a rotating drum, wherein the collector substrate is separated from the needle tip at a distance of about 10 cm. A voltage of about 7.0 kV is applied between the needle tip and the collector substrate, and the solution is extruded from the needle tip at a flow rate of about 1 mL/hour.

In one embodiment, the nanofibers are formed to have an average diameter of about 470 nm. The nanofiber electrode, as formed, has a Pt loading in a range from about 0.025 to about 0.4 mg/cm$^2$ and an electrochemical surface area of about 114 m$^2$/g$_{Pt}$.

In another aspect, the present invention relates to a nanofiber electrode formed by a method that includes the steps of: mixing at least a first amount of a catalyst, and a second amount of an ionomer or uncharged polymer to form a solution; delivering the solution into a metallic needle having a needle tip; applying a voltage between the needle tip and a collector substrate positioned at a distance from the needle tip; extruding the solution from the needle tip at a flow rate such as to generate electrospun nanofibers and deposit the generated nanofibers on the collector substrate to form a mat with a porous network of nanofibers, wherein each nanofiber has distributed particles of the catalyst; and pressing the mat onto a membrane.

In yet another aspect, the present invention relates to a membrane-electrode-assembly (MEA) for an electrochemical device. In one embodiment, the MEA includes a membrane having a first surface and an opposite, second surface, an anode disposed on the first surface of the membrane, and a cathode disposed on the second surface of the membrane. The cathode is formed by the steps of: mixing at least a first amount of a catalyst, a second amount of an ionomer or uncharged polymer, and optionally a third amount of a third polymer to form a solution; delivering the solution into a metallic needle having a needle tip; applying a voltage between the needle tip and a collector substrate positioned at a distance from the needle tip; extruding the solution from the needle tip at a flow rate such as to generate electrospun nanofibers and deposit the generated nanofibers on the collector substrate to form a mat having a porous network of nanofibers, wherein each nanofiber has distributed particles of the catalyst; and pressing the mat onto the second surface of the membrane. The nanofibers are formed to have an average diameter of about 470 nm.

In one embodiment, the catalyst includes platinum-supported carbon (Pt/C) and the ionomer includes Nafion®. Forming the solution further includes mixing a third amount of a second polymer with the first amount of catalyst and second amount of ionomer, wherein the second polymer includes polyacrylic acid (PAA) and the ratios between the catalyst, ionomer, and second polymer are about 15:3:2 by weight.

In one embodiment, the collector substrate includes a carbon paper or carbon cloth gas diffusion layer disposed on a rotating drum, and the distance between the collector substrate and the needle tip is about 10 cm. A voltage of about 7.0 kV is applied between the needle tip and the collector substrate. The solution is extruded from the needle tip at a flow rate of about 1 mL/hour.

In one embodiment, the cathode, as formed, has a Pt loading in a range from about 0.025 to about 0.4 mg/cm$^2$ and an electrochemical surface area of about 114 m$^2$/g$_{Pt}$.

In one embodiment, the membrane is ionically conductive and, in one embodiment, the conductive membrane is proton conductive. In one embodiment, the proton conductive membrane includes a perfluorosulfonic acid (PFSA) that includes Nafion®. In one embodiment, the membrane is a nanofiber composite membrane.

In one embodiment, the catalyst includes at least one of, or a combination of, Pt particles, Pt alloy particles, Pt on carbon particles, precious metal particles, precious metal on carbon particles, precious metal based alloys, previous metal based alloys on carbon particles, Ag particles, Ni particles, Ag alloy particles, Ni alloy particles, Fe particles, Fe alloy particles, Pd particles, Pd alloy particles, core-shell catalyst particles, and non-platinum group metal (PGM) fuel cell catalysts.

In yet another aspect, the present invention relates to a membrane-electrode-assembly (MEA) for an electrochemical device. In one embodiment, the MEA includes a membrane having a first surface and an opposite, second surface, and an anode disposed on the first surface of the membrane. The anode is formed by the steps of: mixing at least a first amount of a catalyst and a second amount of an ionomer or uncharged polymer to form a solution; delivering the solution into a metallic needle having a needle tip; applying a voltage between the needle tip and a collector substrate positioned at a distance from the needle tip; extruding the solution from the needle tip at a flow rate such as to generate electrospun nanofibers and deposit the generated nanofibers on the collector substrate to form a mat comprising a porous network of nanofibers, wherein each nanofiber has a plurality of distributed particles of the catalyst; and pressing the mat onto the first surface of the membrane. The MEA also includes a cathode disposed on the second surface of the membrane.

In one embodiment, forming the solution further includes mixing a third amount of a second polymer with the first amount of catalyst and second amount of ionomer.

In yet another aspect, the present invention relates to a fuel cell. In one embodiment, the fuel cell includes a membrane-electrode-assembly (MEA). The MEA includes a membrane having a first surface and an opposite, second surface, and an anode disposed on the first surface of the membrane. The fuel cell also includes a cathode disposed on the second surface of the membrane. At least one of the anode and cathode is formed by a method that includes the steps of mixing at least a first amount of a catalyst and a second amount of an ionomer to form a solution, and delivering the solution into a metallic needle having a needle tip. The method also includes the steps of applying a voltage between the needle tip and a collector substrate positioned at a distance from the needle tip, and extruding the solution from the needle tip at a flow rate such as to generate electrospun nanofibers and deposit the generated nanofibers on the collector substrate to form a mat with a porous network of nanofibers. The method further includes the step of pressing the mat onto the membrane. Each nanofiber of the formed mat has a plurality of distributed particles of the catalyst. The fuel cell also includes a first flow-field plate having channels that are operative to direct a fuel to the anode, and a second flow-field plate having channels that are operative to direct an oxidant to the cathode.

In one embodiment, the first flow-field plate is operative to direct hydrogen to the anode and the second flow-field plate is operative to direct oxygen to the cathode.

In one embodiment, the catalyst includes platinum-supported carbon (Pt/C).

In one embodiment, the ionomer includes Nafion®.

In one embodiment, the method of forming the solution further includes the step of mixing a third amount of a second polymer with the first amount of catalyst and second amount of ionomer.

In one embodiment, the second polymer includes polyacrylic acid (PAA).

In one embodiment, the ratios between the catalyst, ionomer, and second polymer are about 15:3:2 by weight.

In one embodiment, the collector substrate includes a carbon paper or carbon cloth gas diffusion layer.

In one embodiment, the collector substrate is disposed on a rotating drum.

In one embodiment, the nanofibers are formed to have an average diameter of about 470 nm.

In one embodiment, the cathode, as formed, has a Pt loading in a range from about 0.025 to about 0.4 mg/cm$^2$.

In one embodiment, the cathode, as formed, has an electrochemical surface area of about 114 m$^2$/g$_{Pt}$.

In one embodiment, the membrane is a nanofiber composite membrane.

In one embodiment, the membrane is ionically conductive, and more particularly proton conductive. The proton conductive membrane includes a perfluorosulfonic acid, and the perfluorosulfonic acid membrane includes Nafion®.

In one embodiment, the catalyst includes one of, or a combination of, Pt particles, Pt alloy particles, Pt on carbon particles, precious metal particles, precious metal on carbon particles, precious metal based alloys, previous metal based alloys on carbon particles, Ag particles, Ni particles, Ag alloy particles, Ni alloy particles, Fe particles, Fe alloy particles, Pd particles, Pd alloy particles, core-shell catalyst particles, and non-platinum group metal (PGM) fuel cell catalysts.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
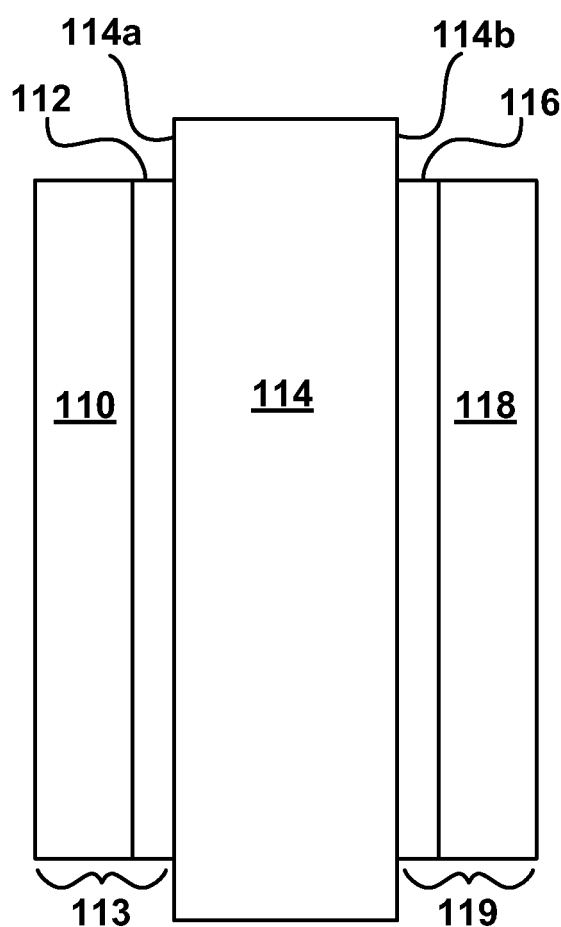
FIG. 1 schematically shows a membrane-electrode-assembly (MEA) formed according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

Definitions

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms.

The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "plurality" means two or more.

As used herein, the terms "comprising," "including," "carrying," "having," "containing," "involving," and the like are to be understood to be open-ended, i.e., to mean including but not limited to.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "nanoscopic-scale," "nanoscopic," "nanometer-scale," "nanoscale," "nanocomposites," "nanoparticles," the "nano-" prefix, and the like generally refers to elements or articles having widths or diameters of less than about 1 nm, preferably. In all embodiments, specified widths can be a smallest width (i.e. a width as specified where, at that location, the article can have a larger width in a different dimension), or largest width (i.e. where, at that location, the article's width is no wider than as specified, but can have a length that is greater).

Overview Of The Invention

The description will be made as to the embodiments of the present invention in conjunction with the accompanying drawings in FIGS. 1-8.

Although various exemplary embodiments of the present invention disclosed herein may be described in the context of fuel cells, it should be appreciated that aspects of the present invention disclosed herein are not limited to being used in connection with one particular type of fuel cell such as a proton exchange membrane (PEM) fuel cell and may be practiced in connection with other types of fuel cells or other types of electrochemical devices such as capacitors and/or batteries without departing from the scope of the present invention disclosed herein.

Now referring specifically to FIG. 1, a membrane-electrode-assembly (MEA) for an electrochemical device is shown, according to one embodiment of the present invention. A MEA according to the embodiment shown in FIG. 1 may be incorporated into an electrochemical device, for example a proton exchange membrane (PEM) fuel cell. Those skilled in the art will recognize that in a typical PEM fuel cell, a MEA has two electrodes, an anode and a cathode. Each of the electrodes is coated on one side with a thin catalyst layer, and the anode and cathode are separated by a proton exchange membrane (PEM). The MEA is disposed between two flow-field plates, and in operation, hydrogen and air or some other fuel and oxidant are provided to the electrodes of the MEA via channels that are formed in the flow field plates. More particularly, one flow-field plate directs hydrogen to the anode and another flow-field plate directs oxygen in the air to the cathode. At the anode, a catalyst layer facilitates separation of the hydrogen into protons and electrons. Free electrons produced at the anode are conducted as a usable electric current through an external circuit. At the cathode, hydrogen protons that have passed through the PEM come together with oxygen in air and electrons that return from the external circuit, to form water and heat.

In the embodiment shown in FIG. 1, the MEA 100 includes a membrane 114 with a first surface 114a and an opposite, second surface 114b. An anode 113 comprised of a gas diffusion electrode 110 coated with a catalyst layer 112 is disposed on the first surface 114a of the membrane 114, and a cathode 119 comprised of a gas diffusion electrode 118 coated with a catalyst layer 116 is disposed on the second surface 114b of the membrane.

Figure 2:
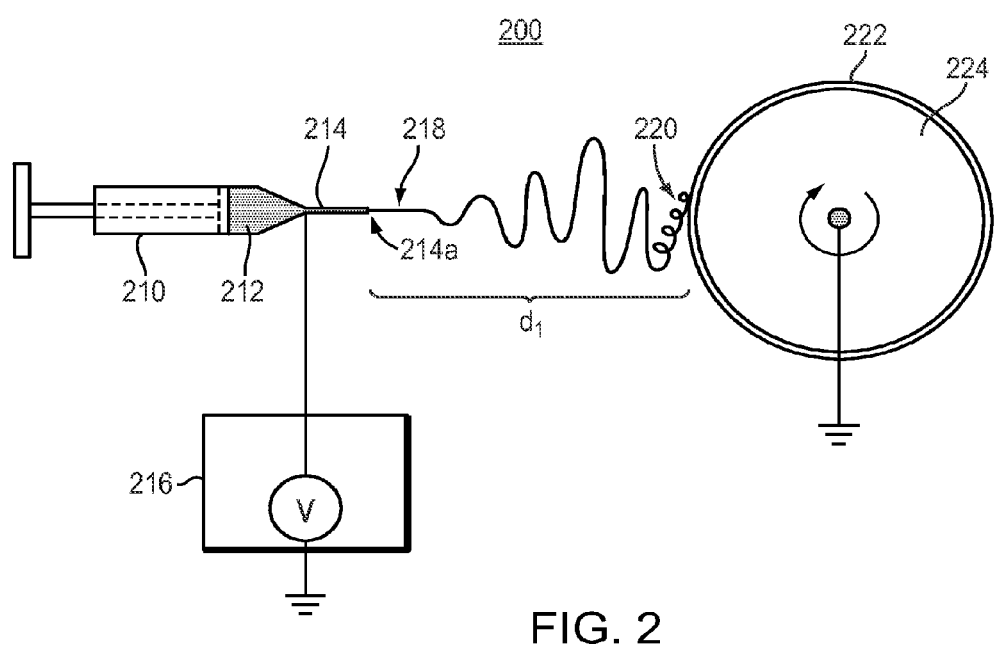
FIG. 2 schematically shows a system for electrospinning a solution to generate nanofibers and deposit the nanofibers on a collector substrate, according to one embodiment of the present invention.
Figure 3:
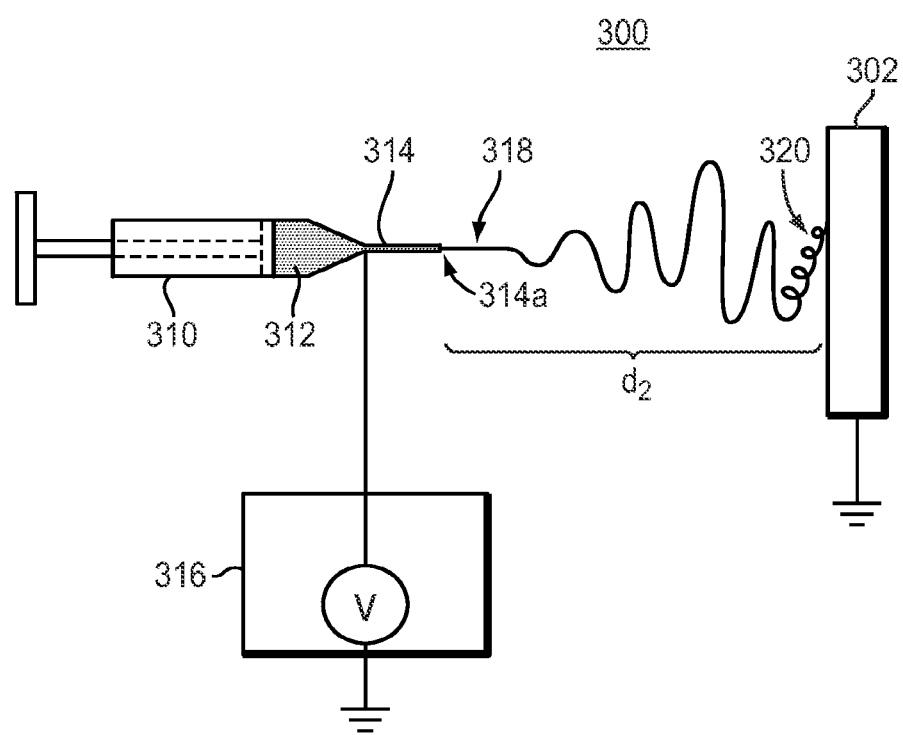
FIG. 3 schematically shows a system for electrospinning a solution to generate nanofibers and deposit the nanofibers on a collector substrate disposed on a rotating drum, according to another embodiment of the present invention.

Now referring to FIGS. 2 and 3, FIG. 2 schematically shows a system 200 for electrospinning a solution to generate nanofibers and deposit the nanofibers on a collector substrate according to one embodiment of the present invention, and FIG. 3 schematically shows a system 300 for electrospinning a solution to generate nanofibers and deposit the nanofibers on a collector substrate according to another embodiment of the present invention. Those skilled in the art will recognize that an electrospinning process typically involves applying a high voltage electric field to a spinneret needle containing a polymer solution or polymer melt. Mutual charge repulsion on the surface of the solution overcomes the surface tension such as to produce and eject a thin liquid jet of the solution from the tip of the spinneret needle. As the jet of electrified solution travels towards a collector with a different electric potential, electrostatic repulsion from surface charges causes the diameter of the jet to narrow. The jet may enter a whipping mode and thereby be stretched and further narrowed due to instabilities in the electric field. Solid fibers are produced as the jet dries and the fibers accumulate on the collector to form a non-woven material.

In operation of the system 200 shown in FIG. 2, according to one embodiment of the present invention, a solution 212 is delivered from a syringe 210 into a metallic needle 214 having a needle tip 214a. In one embodiment, the solution 212 is formed according to steps of the method described below with reference to the flow chart of FIG. 4. A voltage produced by a high voltage generator 216 is applied to the metallic needle 214 such that a potential difference is created between the needle tip 214a and a collector substrate 222. As shown, the collector substrate 222 is disposed on an electrically grounded rotating drum 224. The collector substrate 222 is separated from the needle tip 214a at a predetermined distance $d_1$. A thin liquid jet 218 of the solution is produced and ejected from the tip 214a of the metallic needle 214 at a flow rate such as to generate electrospun nanofibers 220 and deposit the generated nanofibers 220 on the collector substrate 222 to form a mat comprised of a porous network of nanofibers (see FIG. 5).

In operation of the system 300 shown in FIG. 3, according to another embodiment of the present invention, a solution 312 is delivered from a syringe 310 into a metallic needle 314 having a needle tip 314a. In one embodiment, the solution 312 is formed according to steps of the method described below with reference to the flow chart of FIG. 4. A voltage produced by a high voltage generator 316 is applied to the metallic needle 314 such that a potential difference is created between the needle tip 314a and a grounded collector substrate 302. The collector substrate 302 is separated from the needle tip 314a by a predetermined distance $d_2$. A thin liquid jet 318 of the solution is produced and ejected from the tip 314a of the metallic needle 314 at a flow rate such as to generate electrospun nanofibers 320 and deposit the generated nanofibers 320 on the collector substrate 322 to form a mat comprised of a porous network of nanofibers (see FIG. 5).

Figure 4:
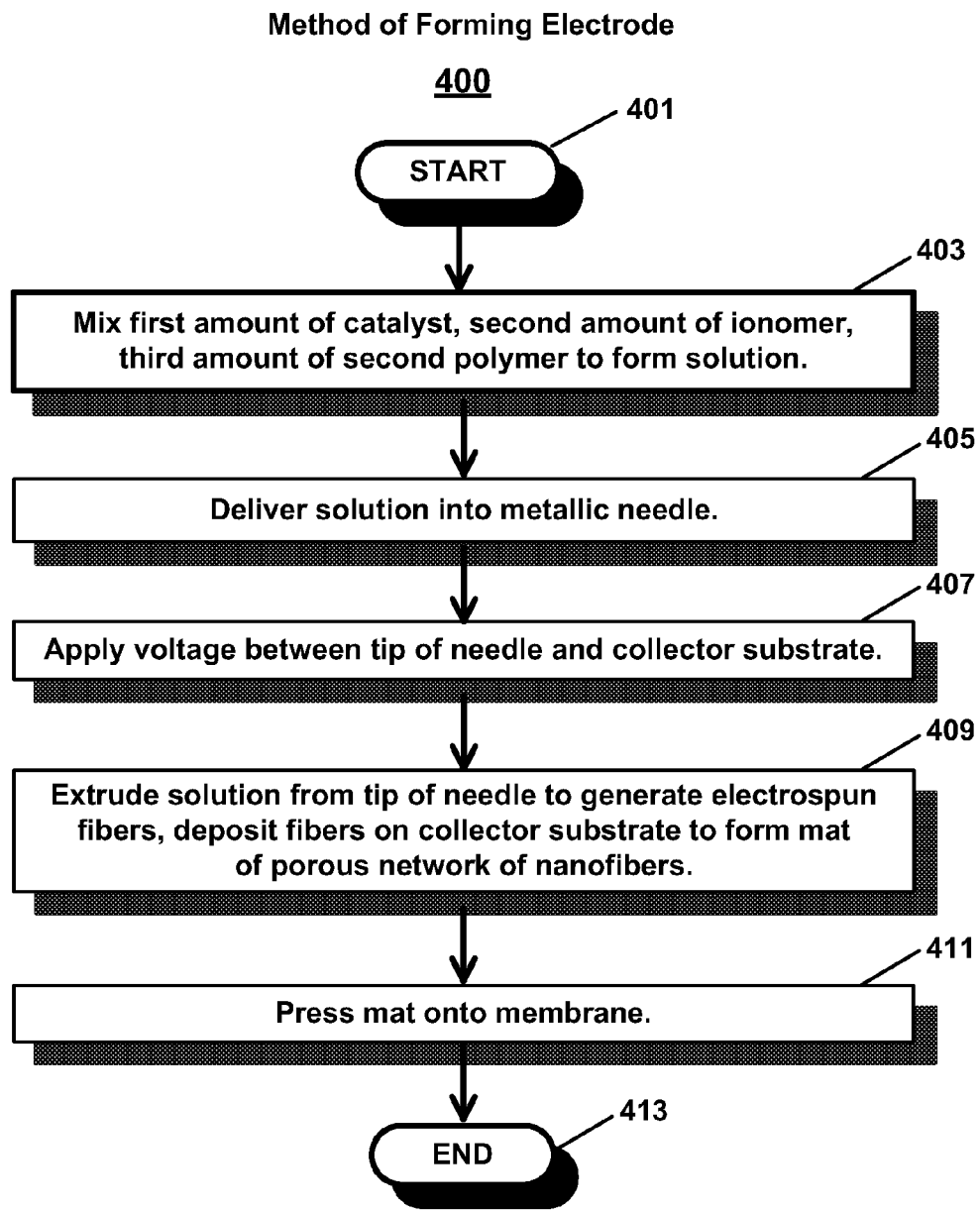
FIG. 4 shows a flow chart of a method of forming an electrode for an electrochemical device, according to one or more embodiments of the present invention.

Now referring specifically to FIG. 4, a flow chart show steps of a method 400 of forming an electrode for an electrochemical device, according to one or more embodiments of the present invention. The method begins at step 401 and includes the steps of mixing at least a first amount of a catalyst and a second amount of an ionomer to form a solution, at step 403, and delivering the solution into a metallic needle having a needle tip, at step 405. Next, at step 407 a voltage is applied between the needle tip and a collector substrate positioned at a distance from the needle. Following step 407, the solution is extruded from the needle tip at a flow rate such as to generate electrospun nanofibers and deposit the generated nanofibers on the collector substrate, to form a mat including a porous network of nanofibers, at step 409. After step 409, the mat is pressed onto a membrane, at step 411, and the method ends at step 413.

EXAMPLES AND IMPLEMENTATIONS OF THE INVENTION

Without intent to limit the scope of the invention, exemplary devices and related results of their use according to embodiments of the present invention are given below. Certain theories may be proposed and disclosed herein; however, in no way they, whether right or wrong, should limit the scope of the invention.

Example 1

This example illustrates, in one or more aspects, a three-dimensional nanofiber fuel cell electrode morphology created by electrospinning. In one exemplary embodiment, electrospun nanofiber mats were prepared from a solution of approximately 75 wt % Pt/C, 15 wt % Nafion®, and 10 wt % poly(acrylic acid) in isopropanol/water solvent. The nanofibers were deposited on a carbon paper GDL substrate that was fixed to a rotating drum collector. The potential difference between the metallic spinneret needle and the drum collector was about 7.0 kV and the spinneret-to-collector distance and flow rate of the solution were fixed at about 10 cm and about 1 mL/hour, respectively. As shown in top-down SEM images of the resulting electrospun catalyst mat 510 in FIG. 5(a), the surfaces of the nanofibers 512 are roughened by Pt/C catalyst nanoparticles. A uniform distribution of Pt/C catalyst nanoparticles can be seen on the surface of the nanofibers 530 in FIGS. 5(c) and 540 in FIG. 5(d), where the average nanofiber diameter is about 470 nm. After annealing and hot pressing the nanofiber electrode onto a Nafion® 212 membrane, the morphology of nanofibers (collectively labeled 520) is maintained and the volume density of fibers increased, as shown in the SEM image of the nanofibers 522 in FIG. 5(b).

Figure 6:
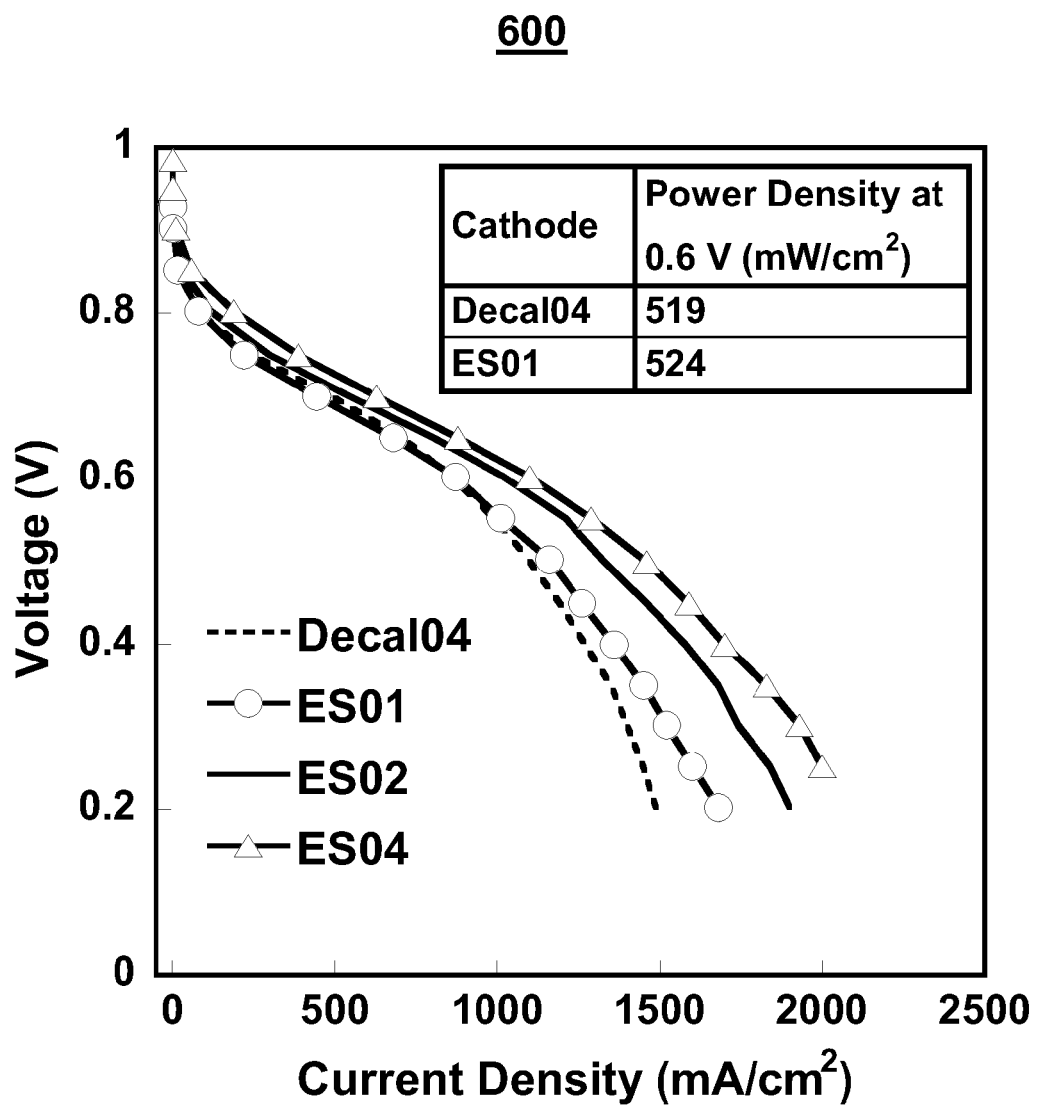
FIG. 6 shows hydrogen/air fuel cell polarization curves for four different cathode catalyst constructs, including constructs according to one or more embodiments of present invention.

To evaluate the performance of the nanofiber catalyst construct according to embodiments of the present invention, membrane electrode assemblies (MEAs) were fabricated using a Nafion® 212 membrane, a decal-processed anode (with a Pt loading of about 0.4 mg/cm$^2$) and an electrospun nanofiber cathode, where the Pt cathode loading was about 0.4 mg/cm$^2$ (designated as ES04 in subsequent figures), or about 0.2 mg/cm$^2$ (designated as ES02), or about 0.1 mg/cm$^2$ (designated at ES01). For comparison, a third MEA was prepared by the decal process for both the anode and cathode, where the Pt loading for each electrode was about 0.4 mg/cm$^2$ (designated as Decal04). Table 1 shows the Pt-loading and the electrochemical surface area (ECSA) of the cathode catalyst layer for the 0.4 mg/cm² decal cathode MEA and the 0.1 mg/cm² electrospun cathode MEA. As can been seen in table 1, the ECSA of the nanofiber electrodes, as determined by in-situ cyclic voltammetry in a fuel cell test fixture at 80° C. with fully humidified $H_2$ and $N_2$, was significantly greater than that for a decal-processed cathode. All four MEAs were evaluated in a hydrogen/air fuel cell (5 cm² MEA) at 80° C. and 100 RH % (% relative humidity) without back pressure. FIG. 6 shows a graph 600 of hydrogen/air fuel cell polarization curves for the four different cathode catalyst constructs. Cell temperature was 80° C. with 125 sccm $H_2$ and 500 sccm air (zero psi back pressure). As shown, ES04 delivers about 1080 mA/cm² at 0.6V, with a maximum power density of about 705 mW/cm². These results represent a 28% improvement in fuel cell performance, as compared to the MEA with a decal cathode and anode. When the Pt-loading of the nanofiber cathode was reduced to 0.2 mg/cm² by using a thinner nanofiber catalyst mat, the power output performance was still better than that of Decal04. When the Pt-loading of the electrospun cathode was further reduced to 0.1 mg/cm², the power density at 0.6 V (524 mW/cm²) was essentially equivalent to that of a decal cathode at the much higher Pt loading of 0.4 mg/cm² (519 mW/cm²). These results show that an electrospun nanofiber electrode morphology according to one or more embodiments of the present invention disclosed herein can generate more power in a PEM fuel cell than traditional decal-processed electrodes. Based on several experiments conducted with different Pt loadings, it is indicated that the present application can be practiced with a nanofiber electrode having a Pt loading in a range from about 0.025 to about 0.4 mg/cm².

TABLE 1

| Sample Name | Pt-loading (mg/cm²) | ECSA (m² Pt/g Pt) |
|---|---|---|
| Decal04 | 0.4 | 60 |
| ES01 | 0.1 | 114 |

Example 2

This example illustrates, in one or more aspects, MEA performance with three-dimensional electrospun nanofiber fuel cell cathode with a Pt-loading of 0.05 mg/cm² (designated as ES005). In one exemplary embodiment, electrospun nanofiber mats were prepared from a solution of approximately 75 wt % Pt/C, 15 wt % Nafion®, and 10 wt % poly(acrylic acid). The nanofibers were deposited on a carbon paper GDL substrate that was fixed to a rotating drum collector. The potential difference between the metallic spinneret needle and the drum collector was about 7.0 kV and the spinneret-to-collector distance and flow rate of the solution were fixed at about 10 cm and about 1 mL/hour, respectively. For MEAs identified as ES005, an electrospun nanofiber catalyst layer was used as the cathode at a Pt loading of 0.05 mg/cm². Nanofiber cathodes were hot pressed onto a Nafion 212 membrane at 140° C. and 16 MPa. Prior to hot-pressing, electrospun nanofiber mats were annealed at 150° C. under vacuum for 2 hours. The Pt loading of a nanofiber mat was adjusted by the electrospinning duration and calculated from the total weight of an electrospun mat and the weight-fraction of Pt/C catalyst used for its preparation. After hot pressing the nanofiber electrode onto a Nafion® 212 membrane, the morphology of nanofibers is maintained and the volume density of fibers increased.

Figure 7:
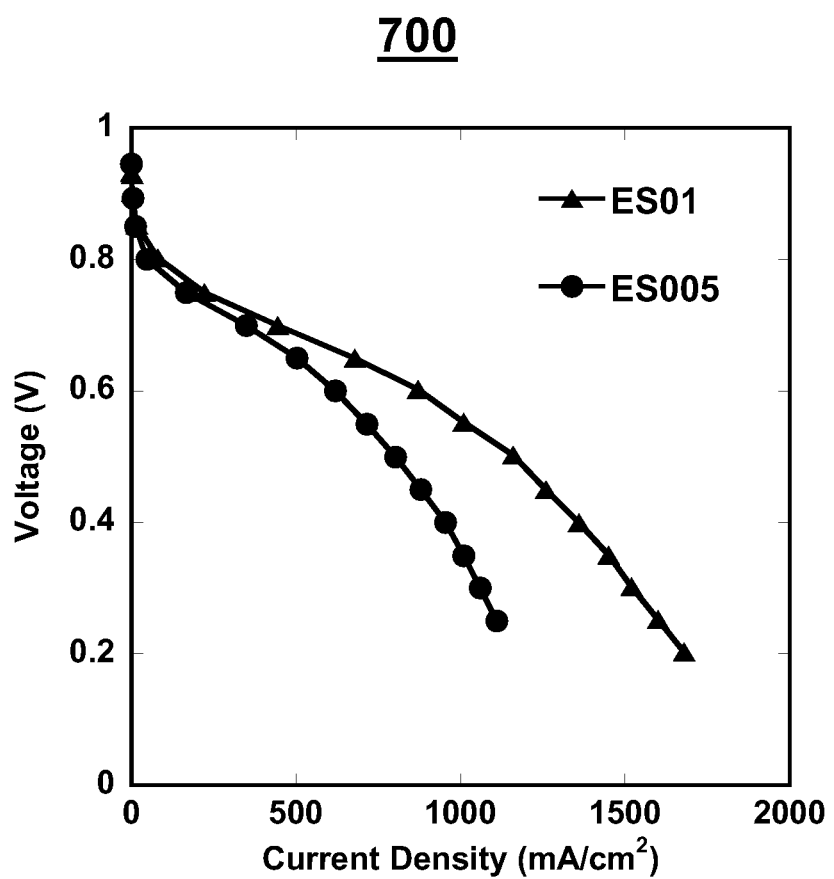
FIG. 7 shows hydrogen/air fuel cell polarization curves for an electrospun cathode and membrane electrode assembly (MEA) according to one or more embodiments of the present invention.

Performance data for a nanofiber cathode with MEA 0.05 mg/cm² Pt loading was collected in a hydrogen/air fuel cell (5 cm² MEA) at 80° C. and 100 RH % (% relative humidity) without back pressure with 125 sccm $H_2$ and 500 sccm air (zero psi back pressure). FIG. 7 shows a graph 700 of hydrogen/air fuel cell polarization curves for an electrospun 0.05 mg/cm² Pt loading cathode with an electrospun 0.1 mg/cm² Pt loading cathode MEA. As shown, ES005 delivers about 620 mA/cm² at 0.6V, with a maximum power density of about 401 mW/cm². These results show that an electrospun nanofiber electrode morphology according to one or more embodiments of the present invention disclosed herein can generate power in a PEM fuel cell with ultra-low Pt loading (here ultra-low Pt loading is defined as a Pt loading less than 0.10 mg/cm²).

Example 3

This example illustrates, in one or more aspects, MEA performance with a three-dimensional electrospun nanofiber fuel cell cathode with Pt-loading of 0.025 mg/cm² (designated as ES0025). In one exemplary embodiment, electrospun nanofiber mats were prepared from a solution of approximately 75 wt % Pt/C, 15 wt % Nafion®, and 10 wt % poly(acrylic acid). The nanofibers were deposited on a carbon paper GDL substrate that was fixed to a rotating drum collector. The potential difference between the metallic spinneret needle and the drum collector was about 7.0 kV and the spinneret-to-collector distance and flow rate of the solution were fixed at about 10 cm and about 1 mL/hour, respectively. For MEAs identified as ES0025, an electrospun nanofiber catalyst layer was used as the cathode at a Pt loading of 0.025 mg/cm² (nanofiber cathodes were hot pressed to Nafion 212 at 140° C. and 16 MPa). Prior to hot-pressing, electrospun nanofiber mats were annealed at 150° C. under vacuum for 2 hours. The Pt loading of a nanofiber mat was adjusted by the electrospinning duration and calculated from its total weight and the weight-fraction of Pt/C catalyst used for its preparation. After hot pressing the nanofiber electrode onto a Nafion® 212 membrane, the morphology of nanofibers is maintained and the volume density of fibers increased.

Figure 8:
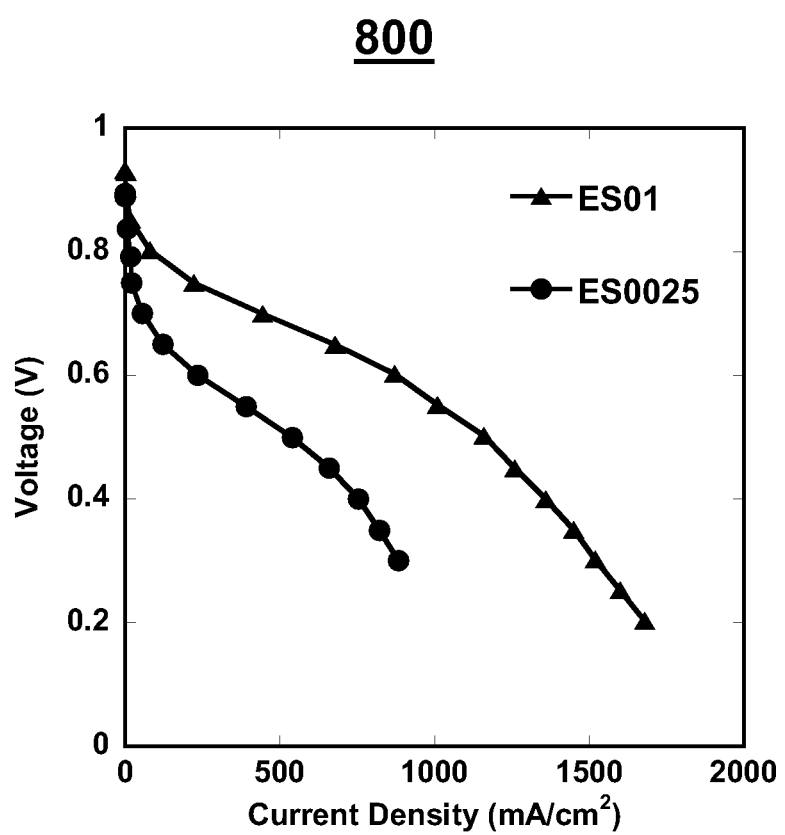
FIG. 8 shows hydrogen/air fuel cell polarization curves for two different cathode catalyst constructs, including constructs according to one or more embodiments of the present invention.

Performance data for a hydrogen/air fuel cell with an electrospun 0.025 mg/cm² Pt loading cathode MEA is shown in FIG. 8. The MEAs were evaluated in a hydrogen/air fuel cell (5 cm² MEA) at 80° C. and 100 RH % (% relative humidity) without back pressure with 125 sccm $H_2$ and 500 sccm air (zero psi back pressure). FIG. 8 shows a graph 800 of hydrogen/air fuel cell polarization curves for the two different cathode catalyst constructs. As shown, ES0025 delivers about 235 mA/cm² at 0.6V, with a maximum power density of about 302 mW/cm². This example further shows that an electrospun nanofiber electrode morphology according to one or more embodiments of the present invention disclosed herein can be created and can be used in a fuel cell MEA to generate power in a PEM fuel cell with ultra-low Pt loading.

For Examples 1-3 disclosed herein and as described above, although the Pt loading varied across the different electrode constructs, electrospinning conditions such as voltage, flow rate, and distance between the needle-spinneret and the collector were kept the same. Also, it should be appreciated that a difference between electrodes with 0.4, 0.2, 0.1, 0.05, and 0.025 mg/cm² Pt loading is the time for electrospinning the respective nanofiber mat. As compared to an electrode with a 0.4 mg/cm² Pt loading, an electrode with a 0.1 mg/cm² Pt loading requires four times less time to prepare with the single needle apparatus shown in the embodiment of FIG. 3. Similarly, as compared to a cathode with a 0.1 mg/cm² Pt loading, a cathode with a 0.025 mg/cm² Pt loading requires four times less time to prepare.

Now referring again to FIGS. 1-5, in one aspect, the present invention relates to a method 400 of forming an electrode for an electrochemical device. In one embodiment, the method includes mixing a first amount of a catalyst, a second amount of an ionomer, and a third amount of a second polymer to form a solution, at step 403. The method further includes delivering the formed solution into a metallic needle, at step 405. At step 407, a voltage is applied between the needle tip and a collector substrate, and at step 409, the solution is extruded from the needle tip at a flow rate such as to generate electrospun nanofibers and deposit the generated nanofibers on the collector substrate to form a mat with a porous network of nanofibers, where each nanofiber has distributed particles of the catalyst. The method also includes pressing the mat onto a membrane, at step 411.

In one embodiment, the catalyst includes platinum-supported carbon (Pt/C), the ionomer includes Nafion®, and the step of forming the solution further includes mixing a third amount of a second polymer with the first amount of catalyst and second amount of ionomer. The second polymer includes polyacrylic acid (PAA), and the ratios between the catalyst, ionomer, and second polymer are about 15:3:2 by weight. The collector substrate includes a carbon paper or carbon cloth gas diffusion layer disposed on a rotating drum, wherein the collector substrate is separated from the needle tip at a distance of about 10 cm. A voltage of about 7.0 kV is applied between the needle tip and the collector substrate, and the solution is extruded from the needle tip at a flow rate of about 1 mL/hour.

In one embodiment, the nanofibers are formed to have an average diameter of about 470 nm. The nanofiber electrode, as formed, has a Pt loading in a range from about 0.025 to about 0.4 mg/cm² and an electrochemical surface area of about 114 m² Pt/g Pt.

Figure 5:
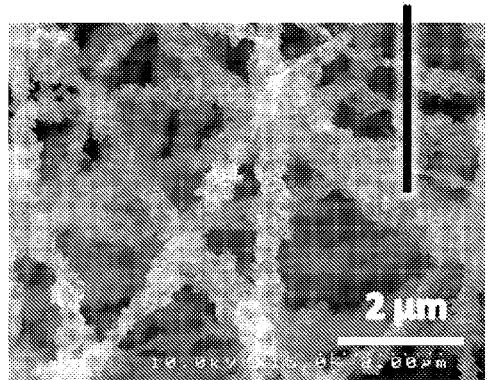
FIG. 5 shows SEM images of electrospun Pt-C/Nafion®/poly(acrylic acid) nanofibers (a) before annealing and hot press and (b) after annealing and hot press, and (c) and (d) show uniform distribution of Pt/C catalyst nanoparticles on the surface of the nanofibers, according to one or more embodiments of the present invention.
Figure 5:
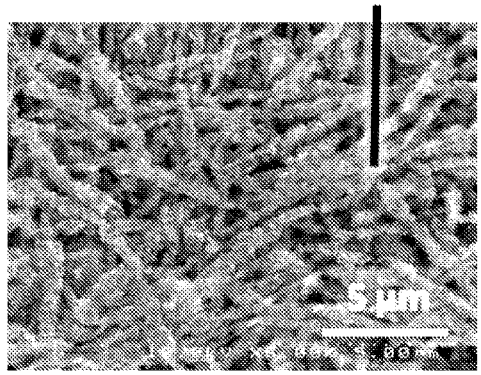
Figure 5:
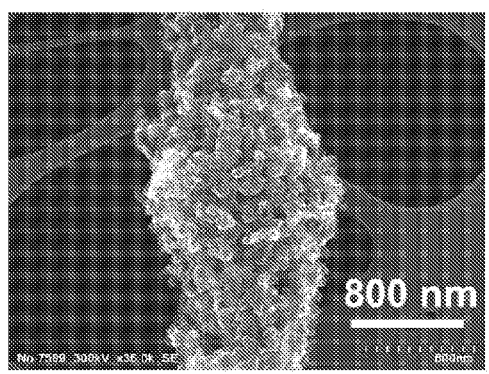
Figure 5:
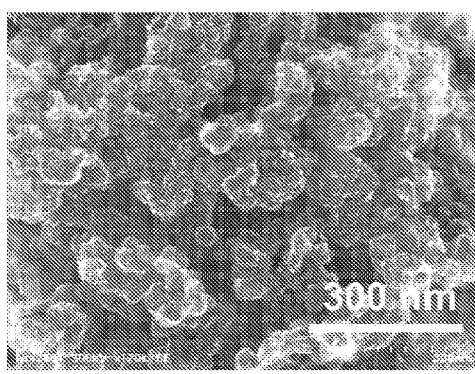

In another aspect, the present invention relates to a nanofiber electrode formed by a method that includes the steps of: mixing at least a first amount of a catalyst and a second amount of an ionomer to form a solution, shown by element 212 in FIG. 2 and element 312 in FIG. 3; delivering the solution into a metallic needle, shown by element 214 in FIG. 2 and element 314 in FIG. 3, that has a corresponding needle tip, shown by element 214a in FIG. 2 and element 314a in FIG. 3; applying a voltage between the needle tip and a collector substrate, shown by element 222 in FIG. 2 and element 302 in FIG. 3, positioned at a distance $d_1$ and $d_2$ from the needle tip, respectively; extruding the solution from the needle at a flow rate such as to generate electrospun nanofibers, shown by element 220 in FIG. 2 and element 320 in FIG. 3, and deposit the generated nanofibers on the collector substrate to form a mat 510 with a porous network of nanofibers, shown by element 512 in FIG. 5, wherein each nanofiber has distributed particles of the catalyst; and, pressing the mat onto a membrane, shown as element 114 in FIG. 1.

In yet another aspect, the present invention relates to a membrane-electrode-assembly (MEA) 100 for an electrochemical device. In one embodiment, the MEA 100 includes a membrane 114 having a first surface 114a and an opposite, second surface 114b, an anode 113 disposed on the first surface 114a of the membrane 114, and a cathode 119 disposed on the second surface 114b of the membrane 114. The cathode 119 is formed by the steps of: mixing at least a first amount of a catalyst and a second amount of an ionomer to form a solution; delivering the solution into a metallic needle having a needle tip; applying a voltage between the needle tip and a collector substrate positioned at a distance from the needle tip; extruding the solution from the needle tip at a flow rate such as to generate electrospun nanofibers and deposit the generated nanofibers on the collector substrate to form a mat having a porous network of nanofibers, where each nanofiber has distributed particles of the catalyst; and pressing the mat onto the second surface of the membrane.

In one embodiment, the nanofibers are formed to have an average diameter of about 470 nm, and the catalyst includes platinum-supported carbon (Pt/C) and the ionomer includes Nafion®. Forming the solution further includes mixing a third amount of a second polymer with the first amount of catalyst and second amount of ionomer, wherein the second polymer includes polyacrylic acid (PAA) and the ratios between the catalyst, ionomer, and second polymer are about 15:3:2 by weight.

In one embodiment, the collector substrate includes a carbon paper or carbon cloth gas diffusion layer disposed on a rotating drum and the distance between the collector substrate and the needle tip is about 10 cm. A voltage of about 7.0 kV is applied between the needle tip and the collector substrate. The solution is extruded from the needle tip at a flow rate of about 1 mL/hour.

In one embodiment, the cathode, as formed, has a Pt loading in a range from about 0.025 to about 0.4 mg/cm² and an electrochemical surface area of about 114 m² Pt/g Pt.

In one embodiment, the membrane is ionically conductive and, in one embodiment, the conductive membrane is proton conductive. In one embodiment, the proton conductive membrane includes a perfluorosulfonic acid (PAA) that includes Nafion®. In one embodiment, the membrane is a nanofiber composite membrane.

In one embodiment, the catalyst includes at least one of, or a combination of, Pt particles, Pt alloy particles, Pt on carbon particles, precious metal particles, precious metal on carbon particles, precious metal based alloys, previous metal based alloys on carbon particles, Ag particles, Ni particles, Ag alloy particles, Ni alloy particles, Fe particles, Fe alloy particles, Pd particles, Pd alloy particles, core-shell catalyst particles, and non-platinum group (PGM) fuel cell catalysts.

In yet another aspect, the present invention relates to a membrane-electrode-assembly (MEA) 100 for an electrochemical device. In one embodiment, the MEA 100 includes a membrane 114 having a first surface 114a and an opposite, second surface 114b, and an anode 113 disposed on the first surface 114a of the membrane 114. The anode 113 is formed by the steps of: mixing at least a first amount of a catalyst and a second amount of an ionomer to form a solution; delivering the solution into a metallic needle having a needle tip; applying a voltage between the needle tip and a collector substrate positioned at a distance from the needle tip; extruding the solution from the needle tip at a flow rate such as to generate electrospun nanofibers and deposit the generated nanofibers on the collector substrate to form a mat with a porous network of nanofibers, where each nanofiber has a plurality of particles of the catalyst distributed thereon; and pressing the mat onto the first surface 114a of the membrane 114. The MEA also includes a cathode 119 disposed on the second surface 114b of the membrane 114.

In one embodiment, forming the solution further includes mixing a third amount of a second polymer with the first amount of catalyst and second amount of ionomer.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A membrane-electrode-assembly (MEA) for an electrochemical device, the MEA comprising:
    (a) a membrane having a first surface and an opposite, second surface;
    (b) an anode disposed on the first surface of the membrane;
    (c) a cathode disposed on the second surface of the membrane, the cathode formed by the steps of:
        (i) mixing at least a first amount of a catalyst, a second amount of a perfluorosulfonic acid polymer, and a third amount of polyacrylic acid (PAA) in a solvent to form a liquid mixture, wherein the liquid mixture is not a true solution and satisfies |δsolvent-δsolute|>1, wherein δsolvent and δsolute are respectively Hildebrand solubility parameters of the solvent and the perfluorosulfonic acid polymer, wherein ratios between the first amount, the second amount and the third amount are about 15:3:2 by weight;
        (ii) delivering the liquid mixture into a metallic needle having a needle tip;
        (iii) applying a voltage between the needle tip and a collector substrate positioned at a distance from the needle tip;
        (iv) extruding the liquid mixture from the needle tip at a flow rate such as to generate electrospun fibers and deposit the generated fibers on the collector substrate to form a mat comprising a porous network of fibers, wherein each fiber has a plurality of particles of the catalyst distributed thereon; and
        (v) pressing the mat onto the second surface of the membrane.

2. The membrane-electrode-assembly of claim 1, wherein the catalyst comprises platinum-supported carbon (Pt/C).

3. The membrane-electrode-assembly of claim 1, wherein the perfluorosulfonic acid polymer comprises Nafion®.

4. The membrane-electrode-assembly of claim 1, wherein the collector substrate comprises a carbon paper or carbon cloth gas diffusion layer.

5. The membrane-electrode-assembly of claim 1, wherein the collector substrate is disposed on a rotating drum.

6. The membrane-electrode-assembly of claim 1, wherein the fibers are formed to have an average diameter of about 470 nm.

7. The membrane-electrode-assembly of claim 1, wherein the cathode, as formed, has a Pt loading in a range from about 0.025 to about 0.4 mg/cm$^2$.

8. The membrane-electrode-assembly of claim 1, wherein the membrane is ionically conductive.

9. The membrane-electrode-assembly of claim 8, wherein the membrane is proton conductive.

10. The membrane-electrode-assembly of claim 9, wherein the proton conductive membrane comprises a perfluorosulfonic acid.

11. The membrane-electrode-assembly of claim 10, wherein the perfluorosulfonic acid membrane comprises Nafion®.

12. The membrane-electrode-assembly of claim 1, wherein the membrane is a nanofiber composite membrane.

13. The membrane-electrode assembly of claim 1, wherein the catalyst comprises Pt particles, Pt alloy particles, Pt on carbon particles, precious metal particles, precious metal on carbon particles, precious metal based alloys, previous metal based alloys on carbon particles, Ag particles, Ni particles, Ag alloy particles, Ni alloy particles, Fe particles, Fe alloy particles, Pd particles, Pd alloy particles, core-shell catalyst particles, non-platinum group metal (PGM) fuel cell catalysts, or a combination thereof.

14. The membrane-electrode-assembly of claim 1, wherein the solvent comprises one or more solvent components.

* * * * *